(12) United States Patent
Ellingson

(10) Patent No.: US 6,871,287 B1
(45) Date of Patent: Mar. 22, 2005

(54) SYSTEM AND METHOD FOR VERIFICATION OF IDENTITY

(76) Inventor: John F. Ellingson, 59 Oak Creek Trail, Madison, WI (US) 53717-1509

( * ) Notice: Subject to any disclaimer, the term of this patent is extended or adjusted under 35 U.S.C. 154(b) by 0 days.

(21) Appl. No.: 09/489,111

(22) Filed: Jan. 21, 2000

(51) Int. Cl.$^7$ .......................... H04L 9/32; G06F 17/60; G06K 9/00
(52) U.S. Cl. ........................ 713/202; 382/115; 705/44; 705/72
(58) Field of Search ........................ 713/155, 182–186, 713/200–202; 340/5.52, 5.54, 5.82–5.85; 382/115–119, 124; 379/88.01, 88.02, 207.13, 903; 700/237; 725/30; 705/18, 72, 39, 44, 1–6; 902/3

(56) References Cited

U.S. PATENT DOCUMENTS

| | | | |
|---|---|---|---|
| 5,553,155 A | * | 9/1996 | Kuhns et al. ............... 382/115 |
| 5,737,420 A | | 4/1998 | Tomko et al. |
| 5,757,916 A | | 5/1998 | MacDoran et al. |
| 5,764,789 A | * | 6/1998 | Pare et al. .................. 382/115 |
| 5,794,207 A | | 8/1998 | Walker et al. |
| 5,802,199 A | * | 9/1998 | Pare et al. .................. 382/115 |
| 5,850,442 A | | 12/1998 | Muftic |
| 5,870,723 A | | 2/1999 | Pare, Jr. et al. |
| 5,881,226 A | | 3/1999 | Veneklase |
| 5,897,616 A | | 4/1999 | Kanevsky et al. |
| 5,913,196 A | | 6/1999 | Talmor et al. |
| 5,915,973 A | | 6/1999 | Hoehn-Saric et al. |
| 5,930,804 A | | 7/1999 | Yu et al. |
| 5,933,498 A | | 8/1999 | Schneck et al. |
| 5,933,816 A | | 8/1999 | Zeanah et al. |
| 6,035,406 A | * | 3/2000 | Moussa et al. ............. 713/202 |
| 6,219,439 B1 | * | 4/2001 | Burger ........................ 382/115 |
| 6,366,682 B1 | * | 4/2002 | Hoffman et al. ............ 382/115 |
| 6,421,453 B1 | * | 7/2002 | Kanevsky et al. .......... 382/115 |
| 6,434,259 B1 | * | 8/2002 | Hamid et al. ............... 382/115 |
| 6,529,885 B1 | * | 3/2003 | Johnson ....................... 705/64 |
| 6,580,815 B1 | * | 6/2003 | Grajewski et al. .......... 382/124 |
| 6,581,042 B2 | * | 6/2003 | Pare et al. .................... 705/40 |
| 6,594,376 B2 | * | 7/2003 | Hoffman et al. ............ 382/115 |
| 6,615,191 B1 | * | 9/2003 | Seeley .......................... 705/54 |
| 6,636,973 B1 | * | 10/2003 | Novoa et al. ............... 713/202 |

FOREIGN PATENT DOCUMENTS

WO  WO 01/54333 A2 *  7/2001  ............. H04L/9/32

OTHER PUBLICATIONS

S. Nanavati, *Central Biometric Authorities*, Information Security Bulletin, vol. 4, Issue 3, May 1999, pp. 25.
*Public Key Infrastructure: From Theory to Implementation*, http://csrc.ncsl.nist.gov/pki/panel/overview.htm, pp. 9.
ITL Bulletin, *Public Key Infrastructure Technology*, http://www.nist.gov/itl/lab/bulletns/archives/july97bull.htm, Jul. 1997.

(List continued on next page.)

*Primary Examiner*—Ayaz Sheikh
*Assistant Examiner*—Christopher Revak
(74) *Attorney, Agent, or Firm*—Katten Muchin Zavis Rosenman

(57) ABSTRACT

A system and method for the identification and verification of a user is provided. The disclosed invention has an enrollment system which includes (i) an alphanumeric input device; (ii) a biometric input device; (iii) a header file database having a plurality of identities; (iv) a search engine in communication with the header file database that searches the database for identifies that match alphanumeric data input by a user according to a predetermined first set of criteria; (v) a processor to score the set of identities matched by the search engine according to a predetermined second set of criteria, and determine that the user's input alphanumeric data based on the score is not suspicious; and (vi) an identity escrow database which receives an approved identity data signal based on the acceptability of the score, and is capable of receiving a biometric identity data signal input by the user to the biometric input device, the escrow database further capable of creating at least one subfile within the escrow database for each user comprising the approved identity data signal and the biometric data signal.

20 Claims, 14 Drawing Sheets

---

Screen G

Sample ACME.COM Merchant Web Site:

(The Web page asks the user to enter his/her name or email address, then to present his/her biometric.)

NAME/EMAIL: _____
BIOMETRIC:   ( ) Voice
             ( ) Fingerprint
             ( ) Other
                     SUBMIT
             (To screen H)

OTHER PUBLICATIONS

RSA Frequently Asked Questions, Question 3.1.2, *How Fast is the RSA Algorithm?*, 1998, http://www.rsasecurity.com/rsalabs/faq/3-1-2.html.

J. Woodward, *Biometric: Privacy's Foe or Privacy's Friend?*, IEEE, vol. 85, No. 9, p. 1489.

*Dynamic Thresholding*, online report located on www.Bio1.com, http://www.biometricgroup.com/a_biometrics_42/dynamic_thresholding.asp, 1998.

R. Clarke, *Human Identification in Information Systems: Management Challenges and Public Policy Issues*, Information Techology & People, 7, 4 (Dec. 1994) 6–37.

*Privacy . . . a Weak Link in the Cyber–Chain*, PriceWaterhouseCoopers, E–Business Leaders Series, White Pages, 1999.

*Facts About Biometrics, the Biometric Industry, and IBIA*, IBIA online report on http://www.ibia.org/understa.htm.

*Frequently Asked Questions About Biometric Technology*, IBIA online report on http://www.ibia.org/faqs.htm.

*Comparison on Biometric Identification Methods*, online report on http://www.and/com/id/products/biometri/biometri.html.

*What is Biometric Authentication?*, American Biometric Company, online report on http://biomouse.com/technology/biometric.htm.

T. Schellberg, *I'm Not your Big Brother: How to Advocate Biometric Legislation in the Age of Privacy Fears*, online report located on www.Bio1.com, http://www.biometricgroup.com/a_bio1/columnists/schellberg1/sld001.htm.

*Has Business Accepted the Self–Regulation Challenge?*, Federal Trade Commissioner Mozelle Thompson, Privacy in American Business, Fifth Annual Conference Journal (Feb./Mar. 1999).

*Equifax/Harris Consumer Privacy Survey*, Lewis Harris & Associates, Inc., New York, Feb. 1996.

P. Chiem, *Hacker Discloses 350,000 Numbers: Web Retailer's Credit Survey Breached*, Chicago Tribune, Business, p. 1 (Jan. 11, 2000).

*Doubts Triggered Over Web Shopping*, Assoc. Press, Jan. 20, 2000.

*Internet Commerce Will Rocket to More than $1 Trillion by 2003*, International Data Corporation press release, Jun. 29, 1999.

* cited by examiner

Screen B

Welcome to e-DENTIFICATION!

To create an e-dentification for yourself, please submit the following information:

NAME: _____

ADDRESS: _____

TELEPHONE: _____

SOCIAL SECURITY: _____

BIOMETRIC:   ( ) Voice
                ( ) Fingerprint
                ( ) Other <u>SUBMIT</u>
(To screen C)

FIG. 7

Screen C

\* If biometric is original \*

Congratulations! You have been e-dentified.
Would you like the e-dentity warranty?

Yes | No
(To screen D) (To screen E)

\* If biometric is not original \*

Please resubmit your biometric . . .

(Back to screen B)

FIG 8

Screen D

Warranty Information

If your identity is ever stolen, e-DENTIFICATION will be source to verify and re-establish your true identity. If you are a warranty holder and your identity is stolen from us, the warranty will pay you $100,000.

The warranty cost is $9.95/year, payable by Visa, Mastercard, American Express, or Discover.

Continue
(To screen E)

FIG. 9

Screen E

Sample Verification:

To demonstrate the use of an e-DENTIFICATION e-dentity, imagine the purchasing procedure of your next online transation. . . .

Continue
(To screen F)

Screen F

Sample ACME.COM Merchant Web Site:

(Shopping cart page with some item about to be purchased. The Web page asks if the user has been e-dentified?)

Yes | No
(To screen G)   (To screen A)

FIG. 12

Screen G

Sample ACME.COM Merchant Web Site:

(The Web page asks the user to enter his/her name or email address, then to present his/her biometric.)

NAME/EMAIL: _____

BIOMETRIC:
( ) Voice
( ) Fingerprint
( ) Other

<u>SUBMIT</u>
(To screen H)

Screen H

\* If biometric matches e-dentity \*

Congratulations!
You have been
e-dentified.

CONTINUE
(To screen I)

\* If biometric does not match \*

Please resubmit your
biometric . . . .

(Back to screen G for three more tries,
then rejects purchase,
provides contact telphone number,
and returns to screen A)

FIG 13

SYSTEM AND METHOD FOR VERIFICATION OF IDENTITY

FIELD OF THE INVENTION

This invention relates to a system and method for establishing an identity of a user and, more particularly, to a system and process for identifying a user to electronic systems such as processors, computers, and computer and electronic networks.

BACKGROUND OF THE INVENTION

Prior art methods of computer and internet security such as cryptographic processes, tokens, dongles, so-called "uncopyable media," and various executable software protection schemes fail to prevent identity fraud. Such methods are incapable of ensuring that the person or entity at each end of a transaction is who he says he is. Because of the anonymous nature of the internet, the security of e-commerce-related information and transactions is a serious problem. At the center of the problem are those individuals who steal other persons' identities so as to perform fraud, pranks, vandalism, espionage and other illegitimate activities. Thus, the predominant internet security issue is identity authentication.

While authentication takes various forms, authentication of individuals is particularly desirable. Authentication is directed to verifying that the individual seeking access to and/or through a server is in fact who that individual claims to be, and not an impersonator. This authentication relies on verification being performed at or above a predetermined minimum level of confidence. At the same time, authentication is generally an early hurdle that the individual must clear to conduct internet transactions with the server.

The traditional method for authenticating individuals has relied on secret passwords. Password-only authentication can be implemented entirely in software. However, password-only authentication has a number of disadvantages. For example, a password's viability is enhanced, among other ways, by increasing its length, by controlling its composition and by it being frequently changed. This, however, is cumbersome and, additionally, passwords can be lost or stolen, particularly written passwords. Passwords can be inadvertently disclosed to crackers via various ploys, such as observing the password's entry on a keyboard. Moreover, passwords can be intercepted as they are transported from the user to the desired server. Consequently, password-only authentication fails to provide adequate security.

Internet-based applications are flooding into areas that can benefit from enhanced security. Examples of such web-based applications include commercial transactions (e.g., loans and the purchase and sale of goods), banking transactions (e.g., electronic funds transfer), and medical transactions (e.g., provision of medical records in emergency situations). The internet is redefining commerce by eliminating the constraints of time and distance. World internet commerce sales are projected to reach between $1.7 and $3.5 trillion by the year 2003 (Source: Forrester Research, Inc.). Identity information and the authentication thereof will drive this explosion. However, many are uncomfortable with the current privacy protections. Although the Merchant's Association reports that e-business is growing by 200% annually, only about 5% of consumers visiting a website actually make purchases. The primary reason for this discrepancy is consumers' concern about privacy and online security. *Has Business Accepted the Self-Regulation Challenge?* Federal Trade Commissioner Mozelle Thompson, Privacy in American Business, Fifth Annual Conference Journal (February/March 1999). Moreover, a recent Business Week/Harris Poll confirms that almost two-thirds of non-internet users would be more likely to start using the internet if the privacy of their personal information and communications would be protected, and that privacy was the primary reason individuals are choosing to stay off the internet, coming in well ahead of cost, concerns with complicated technology, and unsolicited commercial e-mail. *Business Week/Harris Poll on Online Insecurity*, Lewis Harris & Associates, Inc., New York, March 1998.

Additionally, a 1996 Harris Poll reported that 24% of Americans have personally experienced a privacy invasion, which is up from 19% in 1978. The same survey found that 80% of Americans felt that consumers have lost all control over how personal information about them is circulated and used by third parties. *Equifax/Harris Consumer Privacy Survey*, Lewis Harris & Associates Inc., New York, February 1996. Indeed, such fears have been confirmed by actual incidences of identity theft reported by the media. See, e.g., *Hacker Discloses* 350,000 *Numbers: Web Retailer's Credit Security Breached*, Chicago Tribune, Business, p. 1 (Jan. 11, 2000); *Doubts Triggered Over Web Shopping*, Assoc. Press, Jan. 20, 2000 (A "19-year-old Russian" claimed to have stolen 300,000 credit card numbers by exploiting a flaw in CD Universe's System). Accordingly, there is an acute need in the art for a system and method for verifying identity which goes beyond known systems and methods where a user's submitted identity information is not cross-checked against a database of identity information to halt fraud and/or determine the likelihood of an attempt to use fraudulent information.

Obviously, there is a multitude of instances where it is necessary to verify that an individual requesting access to a service, an e-commerce transaction, or a facility is in fact authorized to access the service, execute the transaction or enter the facility. For example, such services include banking services, or telephone services, while the facilities may be for example banks, laboratories, computer systems, or database systems. In such situations, users typically have to write down, present a card, type or key in certain information in order to send an order, make a request, obtain a service, perform a transaction, transmit a message, or enter a facility. Verification or authentication of a customer prior to obtaining access to such services or facilities typically relies essentially on the customer's knowledge of passwords or personal identification numbers (PINs), possession of a card or token, or by the customer interfacing with a remote operator who verifies the customer's knowledge of information such as name, address, Social Security number, city or date of birth, mother's maiden name, etc. In some special transactions, handwriting recognition or signature verification is also employed.

However, such conventional techniques present many drawbacks. First, information typically used to verify a user's identity may be lost or stolen and, with existing technology, a criminal may find it easy to obtain such personal information such as the Social Security number, mother's maiden name or date of birth of his intended target. The shortcomings inherent with the conventional security measures have prompted an increasing interest in biometric security technology, i.e., verifying a person's identity by personal biological characteristics, such as voice printing, finger printing, iris scans, etc. However, even with biometric systems of the prior art, no attempt is made to crossreference the user's alphanumeric identity data (i.e., name, address, Social Security number, etc.) against a database of identities which can determine, to a high degree of certainty, whether the alphanumeric identity data being offered with the biometric identity data is suspicious and/or subject to fraud. Without such cross-checking, a criminal submitting a biometric exemplar together with stolen alphanumeric identity data cannot be recognized as the fraud that he is by the anonymous computer systems which are so prevalent today.

Accordingly, a need exists for improved network and internet-based systems and methods to verify identities.

SUMMARY OF THE INVENTION

The system of the present invention provides an identity-based access control. It defines the authority and delegation of authority to access information, and provides for accountability. The present invention permits the ordering of goods and services in a secure manner over an open and anonymous environment such as the internet or other insecure network. The present invention further permits the payment for goods and services to be transmitted across an open network without fear of diversion to an unauthorized payee. It permits the delivery of intangible personal property and various electronic products in a secure fashion over such open networks. Additionally, the present invention permits the negotiation and formation of contracts in a secure manner over open networks; permits the conduct of auctions in a practical, reliable and trustworthy manner; permits the execution of guarantees in a trustworthy and reliable manner; permits the handling of various securities transactions, including stock purchases, in a secure fashion; and has the advantage of providing a consistent application programming interface which can be utilized in all types of transactions for ensuring security and authenticity of identities.

The invention is also directed to a method of conducting electronic commerce over an unsecured network by enrolling users in an infrastructure system to create an identity escrow or "virtual safety deposit box" for each user, and by verifying the authenticity of each electronic transaction by the user supplying a biometric sample with each transaction such that the biometric sample serves as the "key" to the user's identity escrow, and which causes the escrow to transmit a message to a third party that the user is who he says he is.

These and other advantages and objects of the invention are achieved by providing a system for verifying identities comprising an enrollment system having: (i) at least one alphanumeric input device; (ii) at least one biometric input device; (iii) at least one header file database having a plurality of identities; (iv) at least one search engine, said search engine in communication with said header file database such that said search engine receives an alphanumeric data signal which has been input into said alphanumeric input device by the user, and then searches said database for identities that match the alphanumeric data according to a predetermined first set of criteria; (v) a processor to score the set of identities matched by said search engine according to a predetermined second set of criteria, said processor capable of determining the acceptability or unacceptability of said user's input alphanumeric data based on said score; and (vi) an identity escrow database which is in communication with said processor and receives from said unit an approved identity data signal based on the acceptability of the score, said escrow database additionally in communication with said biometric input device capable of receiving at least one biometric identity data signal input by the user to said biometric input device, said escrow database further comprising means for coupling the approved identity data signal and the biometric identity data signal to create at least one subfile within the escrow database for each user comprising the approved identity data signal and the biometric data signal.

The present invention further comprises a verification system for verifying the identity of said user after the user has enrolled in the enrollment system. The verification system has means for processing a second biometric data signal input by the user to the biometric input device to determine a match of the user's preexisting biometric data in said escrow database according to a predetermined third set of criteria. Finally, the verification system has an output device for transmitting to a third party whether or not a match was located within said escrow database for said user.

The present invention additionally comprises a system and method for providing a warranty to users against identity theft.

Still other objects and advantages of the present invention will become readily apparent to those skilled in the art from the following drawings and detailed description, wherein only the preferred embodiment of the invention is shown and described simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 7 is a screen display of an embodiment of the present invention.

FIG. 8 is a screen display of an embodiment of the present invention.

FIG. 9 is a screen display of an embodiment of the present invention.

FIG. 10 is a screen display of an embodiment of the present invention.

FIG. 11 is a screen display of an embodiment of the present invention.

FIG. 12 is a screen display of an embodiment of the present invention.

FIG. 13 is a screen display of an embodiment of the present invention.

DESCRIPTION OF THE PREFERRED EMBODIMENTS

The principles and operation of the system and method of the present invention may be better understood with reference to the drawings and accompanying description. Fraud is epidemic and growing at five to ten times the rate of overall economic growth. This dramatic increase in growth can be largely attributed to the concomitant proliferation of digital systems and the naive use of "fraud detection" systems.

Scam artists are knowledgeable about the detection systems and use the detection system's own logic to defeat them. These systems took the seemingly easy route in design and are built upon the detection of "suspect" transactions. Knowing which transactions might be "suspect" is only a starting point—not an end in itself. The best measure of such systems (frequently expensive neural network systems) is their early success followed by massive increases in fraud. This is much like the growth of a bacteria that becomes resistant to antibiotics. The present invention differs dramatically in its approach by concentrating on the perpetrator of the fraud rather than the fraudulent transaction. This results in increases in efficiency and effectiveness at far lower cost.

1. System Components.
   A. Enrollment System Components.

Figure 1:
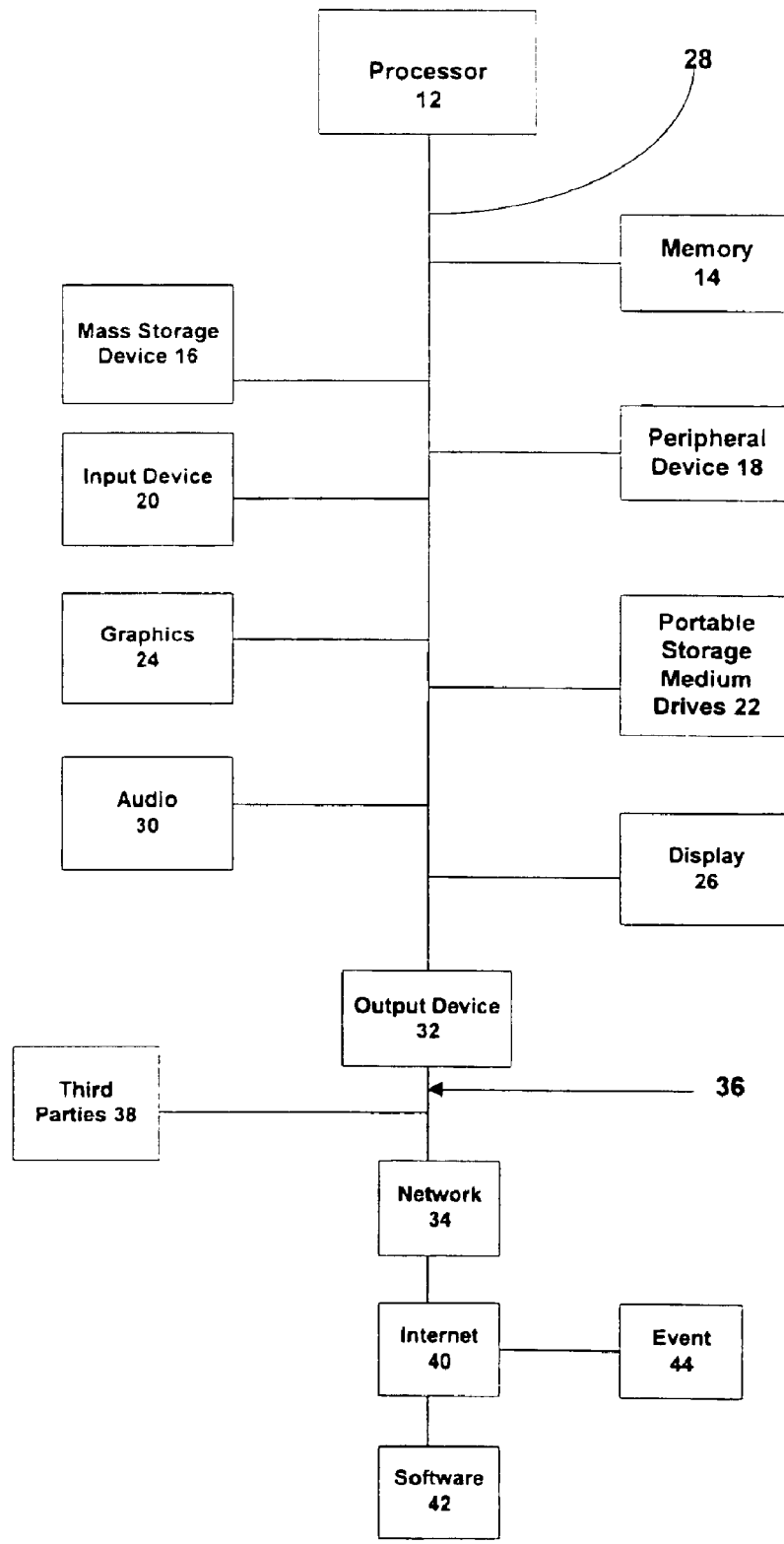
FIG. 1 is a block diagram view of an embodiment the computer system of the present invention.

FIG. 1 illustrates a high-level block diagram of a computer system which is used, in one embodiment, to implement the method of the present invention. The computer system 10 of FIG. 1 includes a processor 12 and memory 14. Processor 12 may contain a single microprocessor, or may contain a plurality of microprocessors for configuring the computer system as a multi-processor system. Memory 14, stores, in part, instructions and data for execution by processor 12. If the system of the present invention is wholly or partially implemented in software, including a computer program, memory 14 stores the executable code when in operation. Memory 14 may include banks of dynamic random access memory (DRAM) as well as high speed cache memory.

The system of FIG. 1 further includes a mass storage device 16, peripheral device(s) 18, input device(s) 20, portable storage medium drive(s) 22, a graphics subsystem 24 and a display 26. For purposes of simplicity, the components shown in FIG. 1 are depicted as being connected via a single bus 28. However, the components may be connected through one or more data transport means. For example, processor 12 and memory 14 may be connected via a local microprocessor bus, and the mass storage device 16, peripheral device(s) 18, portable storage medium drive(s) 22, and graphics subsystem 24 may be connected via one or more input/output (I/O) buses. Mass storage device 16, which is typically implemented with a magnetic disk drive or an optical disk drive, is a non-volatile storage device for storing data and instructions for use by processor 12. In another embodiment, mass storage device 16 stores the computer program implementing the method of the present invention. The method of the present invention also may be stored in processor 12.

Portable storage medium drive 22 operates in conjunction with a portable non-volatile storage medium, such as a floppy disk, or other computer-readable medium, to input and output data and code to and from the computer system of FIG. 1. In one embodiment, the method of the present invention is stored on such a portable medium, and is input to the computer system 10 via the portable storage medium drive 22. Peripheral device(s) 18 may include any type of computer support device, such as an input/output (I/O) interface, to add additional functionality to the computer system 10. For example, peripheral device(s) 18 may include a network interface card for interfacing computer system 10 to a network, a modem, and the like.

Input device(s) 20 provide a portion of a user interface. Input device(s) 20 may include an alphanumeric keypad 46 (FIG. 2) for inputting alphanumeric and other key information, or a pointing device, such as a mouse, a trackball, stylus or cursor direction keys. Biometric input device 48 (FIG. 2) is another type of input device useful in the present invention. All such devices provide additional means for interfacing with and executing the method of the present invention. In order to display textual and graphical information, the computer system 10 of FIG. 1 includes graphics subsystem 24 and display 26. Display 26 may include a cathode ray tube (CRT) display, liquid crystal display (LCD), other suitable display devices, or means for displaying, that enables a user to view the execution of the inventive method. Graphics subsystem 24 receives textual and graphical information and processes the information for output to display 26. Display 26 can be used to display component interfaces and/or display other information that is part of a user interface. The display 26 provides a practical application of the method of the present invention since the method of the present invention may be directly and practically implemented through the use of the display 26. The system 10 of FIG. 1 also includes an audio system 30. In one embodiment, audio system 30 includes a sound card that receives audio signals from a microphone that may be found in peripherals 18. Additionally, the system of FIG. 1 includes output device(s) 32. Examples of suitable output devices include speakers, printers, and the like.

The devices contained in the computer system of FIG. 1 are those typically found in general purpose computer systems, and are intended to represent a broad category of such computer components that are well known in the art. The system of FIG. 1 illustrates one platform which can be used for practically implementing the method of the present invention. Numerous other platforms can also suffice, such as Macintosh-based platforms available from Apple Computer, Inc., platforms with different bus configurations, networked platforms, multi-processor platforms, other personal computers, workstations, mainframes, navigation systems, and the like.

Alternative embodiments of the use of the method of the present invention in conjunction with the computer system 10 further include using other display means for the monitor, such as CRT display, LCD display, projection displays, or the like. Likewise, any similar type of memory, other than memory 14, may be used. Other interface means, in addition to the component interfaces, may also be used including alphanumeric keypads, other key information or any pointing devices such as a mouse, trackball, stylus, and cursor or direction key.

In a further embodiment, the present invention also includes a computer program product which is a storage medium (media) having instructions stored thereon/in which can be used to program a computer to perform the method of interfacing of the present invention. The storage medium can include, but is not limited to, any type of disk including floppy disks, optical disks, DVD, CD ROMs, magnetic optical disks, RAMs, EPROM, EEPROM, magnetic or optical cards, or any type of media suitable for storing electronic instructions.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems and user applications. Ultimately, such computer readable media further includes software for performing the method of interfacing of the present invention as described above.

As illustrated in FIG. 1, computer system 10 is coupled to network 34, such as the internet 40, across communications lines 36. Preferably, the communications lines 36 are dedicated lines (e.g., LAN, WAN, standard dial out phone line, dedicated lease line, DSL) with a frame relay (or point-to-point) connection. Computer system 10 may be directly linked to third party vendees (e.g., banks and other financial institutions) with the software of the present invention rather than communicating with computer system 10 through the internet. The third party computer systems 38 are, for example, a mainframe or PC's of at least XX486 processing ability (e.g., Pentium CPU) having a one gigabyte drive, 16 megabytes of RAM (random access memory), with typical I/O accessories including a keyboard, display, mouse and printer, or similar workstation. Each of the third party computer systems 38 and system 10 (specifically storage device or server 16) also have a modem (e.g., CSDSU, TI communication, or cable modems) for coupling to the communication line 36 and enabling communications between system 10 and third party computer system 38.

Mass storage device or server 16, output device or server 32 and memory 14 may be implemented by one digital processor 12. In that case, consolidation, scheduling, initial and subsequent segmenting of customers and execution of working programs are accomplished through the one processor running the inventive software. Neural networks may be employed to operate on mass storage device 16 and portable storage medium drives 22 to learn each individual customer's purchasing behavior and segment customers and potential customers accordingly. As used herein, "customer (s)" is the person who is the subject of the identity verification.

Further, instead of the neural networks, a multiple regression correlation based on the customer data in devices 16 and 22 may be used for segmenting customers. Alternatively, rule based expert systems may be similarly employed in the present invention to provide dynamic behavioral segmentation.

The expert system comprises a set of decision rules which operate to "customize" the processing and output of the software system used in the enrollment and verification of each customer, based on certain customer-specific input data. The decision rules define the logic used to make decisions which, in turn, becomes additional inputs to the software system for the purpose of customizing the output presented to the customer.

In a further example, and as more fully described below, the invention may be employed on the internet 40. A website can be created with a home page with topic selections and links (e.g., Hypertext HTML technology) to appropriate software programs 42 triggering questionnaires, identity verification and the transmission of information. In particular, for each topic selection there is a respective hyperlink to a software program 42 and optionally an event 44 for initiating the program 42. Upon the customer's selection of a topic from the home page, the present invention applies the linked event 44, if any. If the criteria of the event 44 are met (or if there is no initiating event 44), then the present invention executes the corresponding working program 42. This results in the working program 42 contents being transmitted online to the customer.

In another embodiment, the present inventive system 10 is based at a main site of a company. Different branches, departments and/or sites of the company may utilize the system from separate workstations as though they are the separate systems 10.

Figure 2:
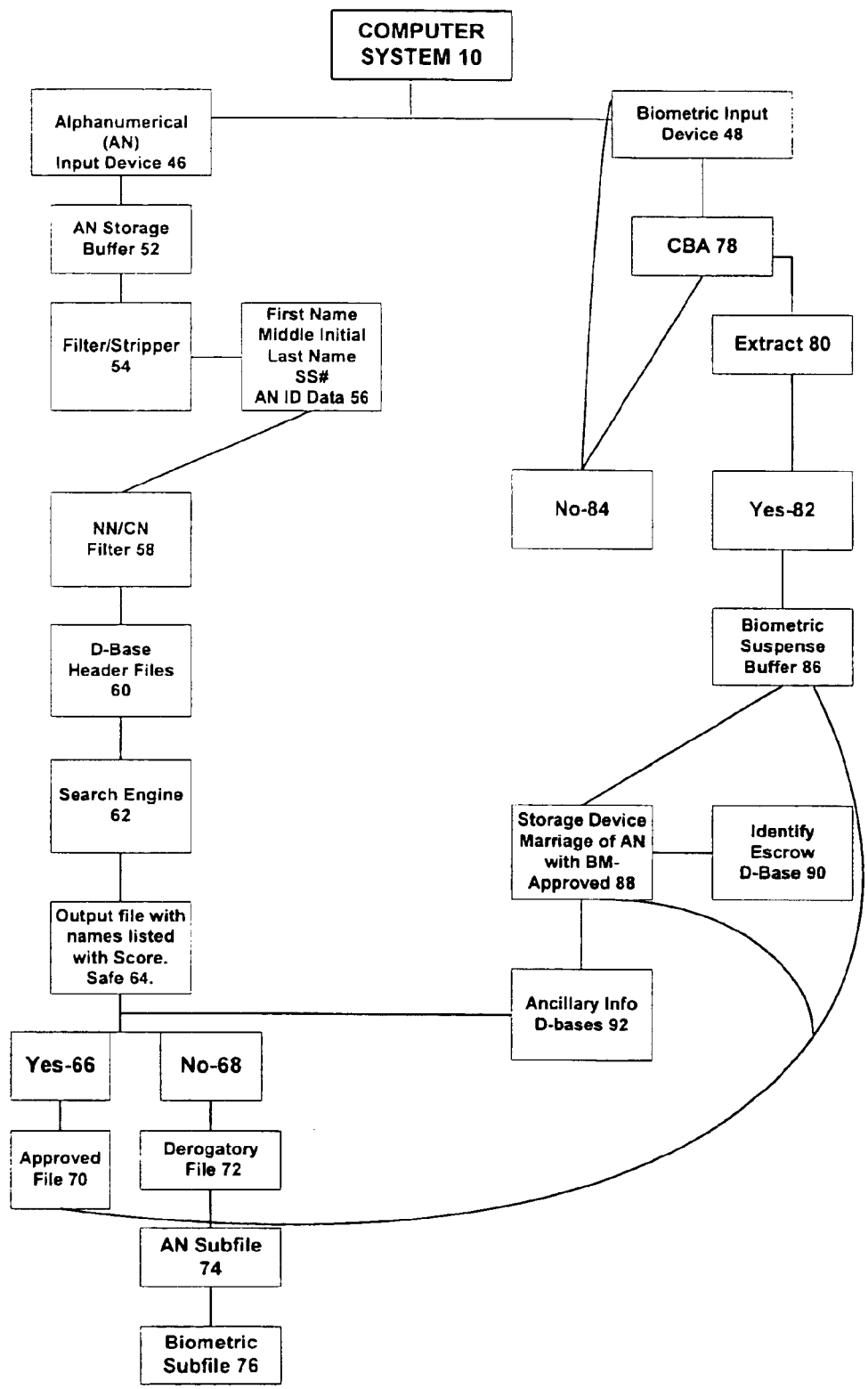
FIG. 2 is a block diagram view of an embodiment of the enrollment system of the present invention.

Referring to FIGS. 1 and 2, the computerized enrollment system 50 comprises alphanumeric keypad or input device 30 and biometric input device 32. Alphanumeric input device 46 can be any device capable of capturing alphanumeric data from a user, such as, for example, a standard personal computer, hand-held computer, or other scuzzy device, or a telephone, pager, or other suitable telecommunications device. To enroll in system 50, the user enters alphanumeric identity data into device 46 such as first name (FN), middle initial (MI), last name (LN), address, e-mail address, telephone numbers, Social Security number (SSN), etc. Such identity data is transmitted as a digital signal to alphanumeric storage buffer 52 where it is stored in a suspense file. Buffer 52 can be any storage device used in the art capable of temporary or suspensory storage. The user's identity data signal is then transmitted from buffer 52 to filter/stripper 54 where the user's first name, middle initial, last name and Social Security number are stripped away and separated from the user's other identity data to form alphanumeric identity data signal 56. The other portion of identity data is stored in a separate storage device (not shown). Signal 56 is then transmitted to normal name (NN)/common name (CN) filter 58. Filters 54 and 58 are standard filter devices well known in the art. The purpose of filter 58 is to differentiate between very common names (e.g., John Brown, Al Smith) that occur more than about 40,000 times in database header file 60, which contains hundreds of millions of identity records. Thus, NN/CN filter 58 is programmed to distinguish between such common names and normal names (i.e., those appearing in file 60 less than about 40,000 times).

As further explained below, when search engine 54 builds keys for each user's identity data signal, different keys and weighting instructions are used for common names versus normal names. The primary difference is that the numeric component (i.e., SSN) of a common name record is weighed more heavily than the alphanumeric component as a predetermined first set of criteria. Consequently, the user's identity data signal is modified to identify it as an NN or CN to search engine 62.

Search engine 62 is comprised of search software known in the art, such as SSA-3 available from Search Software America. Search engine 62 is installed and configured to run on and sort header file database 60. Database 60 contains one or more header files available from the commercial credit bureaus such as, for example, Equifax or Deluxe Corporation. The header file contains identity information (i.e., names and Social Security numbers) of hundreds of millions of identity records. Because there are only about 160 to 180 million people in the United States who could be in database 60, most individuals appear in the database more than once.

Upon the initial installation of header files to database 60, search engine 62 first searches the header files against themselves to sort the similar or related identities into sets, and to locate sets of identities that contain suspicious variations of identity information. The matching identities of database 60 are scored (as explained below) according to a predetermined second set of criteria to determine the suspicious records.

B. System to Recognize Deceptive Identities.

After search engine 62 performs the initial sorting and scoring of all identity records, it is ready to be presented with a user's enrollment identity data record from filter 54. The data signal of the user's alphanumeric identity record from filter 54 is assigned its own set of keys (i.e., FN, MI, LN, SSN, NN, CN) in search engine 62's software. These keys are a predetermined set of criteria, which are used to search database 60 for matching identity records. The user's keys are compared with the keys in the credit bureau header file database 60, and the returned matching identities are scored as shown below to determine the deviation from the captured alphanumeric identity data.

Key:
NN=NORMAL NAMES
CN=COMMON NAMES
FN=FIRST NAME
LN=LAST NAME
MI=MIDDLE INITIAL
SSN=SOCIAL SECURITY NUMBER
0=0 CHANGES IN IDENTITY DATA
1=1 CHANGE IN IDENTITY DATA
2=2 CHANGES IN IDENTITY DATA
3=3 CHANGES IN IDENTITY DATA
2T=2 TRANSPOSITIONS IN IDENTITY DATA
T=FN/LN TRANSPOSITION AND 1 CHANGE IN IDENTITY DATA
T+1=TRANSPOSITION AND 1 CHANGE IN IDENTITY DATA
&=ADDITION OR ABSENCE OF MI IN IDENTITY DATA
Y=NAME OR MI CHANGE IN IDENTITY DATA
Italics=Alternate means of change in data
Note: Diminutives and nicknames are not recognized as a change.

As the scores increase, generally changes become subtler. As scores increase from 50 to 100 they represent changes in groups from two or more individuals to a single individual making suspicious changes. At 96 to 97 there is a transition from suspicious to innocent changes.

 = most suspicious manipulations, i.e., scores of 76 through 97

The following charts represent the relative distribution used to score the various data deviations and to determine the likelihood of a fraudulent manipulation.

| 73 | FN | MI | LN | SSN |
|---|---|---|---|---|
| NN | Y | Y& | | 3 |
| *NN* | | *Y&* | *Y* | *3* |
| CH | | | | |

Significant name change.

| 74 | FN | MI | LN | SSN |
|---|---|---|---|---|
| NN | Y | | | 3 |
| *NN* | | | *Y* | *3* |
| CN | | | | |

Significant name change.

| 75 | FN | MI | LN | SSN |
|---|---|---|---|---|
| NN | | & | | 3 |
| *NN* | *T* | *&* | *T* | *3* |
| CN | | | | |

Significant name change.

| 76 | FN | MI | LN | SSN |
|---|---|---|---|---|
| NN | | | Y | 3 |
| *NN* | *Y* | | | *3* |
| *NN* | *T* | | *T* | *3* |
| CN | Y | | Y | 2 |
| *CN* | *T+Y* | *&* | *T+Y* | *2* |

Minimal name chnage.

With or without the deletion and/or addition of a middle initial.

| 77 | FN | MI | LN | SSN |
|---|---|---|---|---|
| NN | | | Y | 3 |
| *NN* | *Y* | | | *3* |
| *NN* | | *&* | *Y* | *3* |
| CH | Y | & | | 2 |

Minor name change: Brown to Browne, typically a single letter, or addition of hyphenated name and 3 digits changed.

| 78 | FN | MI | LN | SSN |
|---|---|---|---|---|
| NN | Y | | | 2 |
| *NN* | | | *Y* | *2* |
| *NN* | *Y* | | *Y* | *1* |
| *NN* | *T* | | *T* | *3* |
| *NN* | *Y* | *Y* | | *0* |
| CH | | & | Y | 2 |

Three changes: 2 SSNs changed and 1 name change, or 2 name changes and 1 SSN change, or name transposition and 3 SSN changes, Name changes are typically trivial and usually phonetic.

\* Aberration, significant first name and MI change with no SSN change, only one example found.

Name changes are significant with more than 1 letter involved.

| 79 | FN | MI | LN | SSN |
|---|---|---|---|---|
| NN | | & | | 3 |
| CN | | & | | 2 |
| CN | | | | 2+*T* |

Addition or subtraction of MI and 3 SSN changes.

With or without the deletion or addition of the middle initial. Digit changes frequently subtle (7 to 8).

Two digits plus a single transposed pair of numbers.

| 80 | FN | MI | LN | SSN |
|---|---|---|---|---|
| NN | | | | 3 |
| CH | | | | |

No name changes (except diminutive manipulations); 3 SSN changes.

No Common Names in this score range.

| 81 | FN | MI | LN | SSN |
|----|----|----|----|-----|
| NN |    |    | Y  | 1   |
| *NN* |    | *Y* |    | *1* |
| *NN* | *T* |   | *T* | *2* |
| *NN* |    |    | *Y* | *2* |
| CH |    |    |    |     |

Typically 2 changes; 1 name and 1 SSN; 2 name; 2 SSN changes.

Name and/or SSN transpositions are counted as a single change.

No Common Names in this score range.

| 82 | FN | MI | LN | SSN |
|----|----|----|----|-----|
| NN | Y  | &  |    | 2   |
| *NN* |    | *&* | *Y* | *2* |
| *NN* | *Y* | *Y* |   | *2* |
| *NN* |    |    |    | *2* |
| *NN* | *Y* |    |    |     |
| CN |    |    |    |     |

No Common Names in this score range.

| 83 | FN | MI | LN | SSN |
|----|----|----|----|-----|
| NN | Y  |    |    | 2   |
| *NN* | *Y* | *&* |   | *2* |
| *NN* | *Y* |    |    | *1* |
| *NN* | *Y* |    |    | *3* |
| *NN* | *Y* | *Y* |   | *1* |
| CN |    |    |    |     |

SSN manipulation is rearrangement of 3 digits, but no changes in digits.

No Common Names in this score range.

| 84 | FN | MI | LN | SSN |
|----|----|----|----|-----|
| NN | Y  | Y  |    |     |
| *NN* |    | *Y* | *Y* |    |
| CH |    |    |    |     |

Any combination of 1 name change, and a middle initial change.

No Common Names in this score range.

| 85 | FN | MI | LN | SSN |
|----|----|----|----|-----|
| NN | T  |    | T  | 2   |
| NN | Y  | Y  |    |     |
| NN | Y  |    | Y  | 1   |
| NN |    | Y  | Y  |     |
| NN | Y  | Y  |    | 1   |
| CN |    | Y  | Y  | 1   |

Primary type of change.

Any combination of a name and middle initial change, and 1 digit change.

| 86 | FN | MI | LN | SSN |
|----|----|----|----|-----|
| NN |    | Y  |    |     |
| *NN* |    |    |    | *2* |
| *NN* |    | *&* |   | *2* |
| CH |    |    | Y  | 1   |

May include the use of a hypenated name; not viewed as a name change.

| 87 | FN | MI | LN | SSN |
|----|----|----|----|-----|
| NN |    |    | Y  | 1   |
|    | Y  |    |    | 1   |
|    | Y  |    |    | 1+T |
| CN | Y  | &  |    | 1   |

Typically a transposition of two letters (ANUTE, AUNE).

One number change and a transposition of 2 numbers.

Also includes misplaced middle names, and 1 digit change.

| 88 | FN | MI | LN | SSN |
|----|----|----|----|-----|
| NN |    | &  | Y  | 1   |
|    | Y  | &  |    | 1   |
| NN | Y+T |   | Y+T |    |
| CN |    | &  |    | 1   |
| CN |    |    | Y  | *1* |

Number changes are subtle (4 to 5; 2 to 3).

Last name change is subtle; one or two letters deletion or substitution.

| 89 | FN | MI | LN | SSN |
|----|----|----|----|-----|
| NN | Y  |    |    | 1   |
| *NN* |    |    | *Y* | *1* |
| *NN* | *Y* | *&* |   | *1* |
| CN |    |    |    | 1   |

One name change and one SSN change.

Rare occurrence.

May include the occassional inclusion of a middle initial.

| 90 | FN | MI | LN | SSN |
|----|----|----|----|-----|
| NN |    | Y  |    |     |
| NN |    |    | Y  |     |
| NN |    | &  | Y  |     |
| NN |    |    | Y  | 1   |
| NN | Y  |    | Y  |     |
| NN |    |    |    | 1   |
| CN |    |    |    |     |

Typical change is a simple name change or a single digit change.

No Common Name in this score range.

| 91 | FN | MI | LN | SSN | |
|---|---|---|---|---|---|
| NN | | | Y | 1 | Addition or deletion of a letter in last name and 1 digit change. |
| *NN* | | | *Y* | | Change of the first letter of last name. |
| NN | *T* | | *T* | | |
| *NN* | | | *Y* | *T* | One letter change in last name and transposition of one pair of digits and change of 1 digit. |
| *NN* | *Y* | | | *1* | One letter change in first name and 1 digit change. |
| CN | | | | | No common Names in this score range. |

| 92 | FN | MI | LN | SSN | |
|---|---|---|---|---|---|
| NN | | & | | 1 | |
| NN | | | | *T* | Transposition of a single pair of digits. |
| CN | | | | *T* | May or may not include an addition or deletion of a middle initial. |
| CN | | | | 1 | Very subtle digit change; loop confusion (3 to 8) or one digit move (7 to 8)-this manipulation is rare in Common Names. |

| 93 | FN | MI | LN | SSN | |
|---|---|---|---|---|---|
| NN | Y | | | | Typically, the addition of a single letter (ADAMS to ADAMES). |
| *NN* | | | | *1* | Single digit change; very subtle (3 to 4, or 4 to a 9-loop confusion). |
| CN | | | | | No Common Names in this score range. |

| 94 | FN | MI | LN | SSN | |
|---|---|---|---|---|---|
| NN | Y | | | | Addition or deletion of a letter, not a diminutive change; sometimes a similar name |
| *NN* | | | *Y* | | Addition or deletion or change of a single letter-either combination may be coupled with an addition or deletion. |
| CN | T | | T | | Only one occurence in entire record set. |

| 95 | FN | MI | LN | SSN | |
|---|---|---|---|---|---|
| NN | T | | T | | Name transposition, sometimes with the addition or deletion of a middle initial or subtle letter subtitution. |
| CN | | | | | |

| 96 | | | | | |
|---|---|---|---|---|---|
| NN | Y | | | | Single letter change, possible an addition, with or without a deletion or addition of a middle initial. |
| *NN* | | | *Y* | | Same subtle manipulation as above. |
| CN | T+Y | Y | | T+Y | Nearly all are Vietnamese or Middle Eastern names; very occasionally a Hispanic name. |

| 97 | FN | MI | LN | SSN | |
|---|---|---|---|---|---|
| NN | Y | | | | Same as 96, but more subtle, yet not innocent. |
| *NN* | | | *Y* | | |
| CH | | Y | | | Not typically phonetic changes. |

| 98 | FN | MI | LN | SSN | |
|---|---|---|---|---|---|
| NN | Y | | | | Single simple change, such as an error in transcription or handwriting error-probably innocent error. |
| CN | | & | | | |

| 99 | FN | MI | LN | SSN | |
|---|---|---|---|---|---|
| NN | T | | T | | Mostly simple transpositions of names with or without the addition or deletion of a middle initial. |
| | | | | | Frequently foreign names, probably caused by a lack of knowledge in the recording of the names-innocent. |
| CN | Y | | | | Change, or addition or deletion of a single letter. |
| *CN* | | | *Y* | | Change, or addition or deletion of a single letter. |

| 100 | FN | MI | LN | SSN | |
|---|---|---|---|---|---|
| NN | | | | | No Changes; duplicate record. |
| CH | | | | | |

C. Creation of Scoring Method.

To achieve the above scoring system, applicant employed several unique search strategies. The first strategy relied upon the importance of context in giving meaning to the content of the information. For example, if the content of the information is "9 to 5," depending upon the contextual setting, the information may be one's working hours; or it might be the final score in the seventh game of the World Series. Context can dictate the meaning of the content. Thus, the context of the records derived from attempts to open checking accounts at banks was an important factor in how applicant analyzed the data.

The second strategy relates to the premise that information may be false and should be treated that way. Since applicant was looking for attempts to defraud banks, he assumed the professional criminal was likely lying to the bank about who the criminal was. This is fundamental because if the criminal were to identify himself as someone who defrauded banks, the bank would be not deal with him. The importance of this assumption of falsity for the information system was crucial. To prove that a criminal lied about his identity, applicant's goal was to find two identities purportedly belonging to the same person that were different, suspicious and mutually exclusive.

Conventional wisdom dictates that the more information fields analyzed, the better result. However, many of the information fields, such as addresses, drivers license numbers, phone numbers, etc., not only legitimately change over time, but are frequently obtained from unreliable sources. Dealing with unreliable and potentially innocent changes to information creates a burden and could well bias the final output of the system. Applicant focused entirely upon information that does not legitimately change over an individual's lifetime, except for very specific and known reasons, e.g., a woman changing her name when she marries. Alterations in the name fields and the Social Security number field could be assumed to be either innocent (e.g., the use of a nickname, or the adoption of a married name, or a typographical error), or suspicious. Therefore, applicant needed only to identify and screen out the known types of innocent and legitimate identity changes to be left with the suspicious changes.

Because there is a nearly infinite range of identity changes possible between one person manipulating their identity and the real identity of a third person, applicant needed to carefully calibrate his system to draw the line between intentional suspicious alterations and innocent third party identities (i.e., false positives). This iterative calibration resulted in the above-stated scoring grids.

The above scoring or benchmarking process is used to determine to a high degree of certainty whether a change in identity data is intended to deceive the recipient of the data. Applicant has determined that scores of 76 through 97 represent changes associated with an intent to deceive. Such determination about this scoring range resulted from applicant's analysis and measurement of fraudulent conduct in the United States. Using 1993 data from the Justice Department (Uniform Crime Report and affiliated documents) and census data, applicant constructed a model of fraud activity in the United States for 1993.

Figure 3:
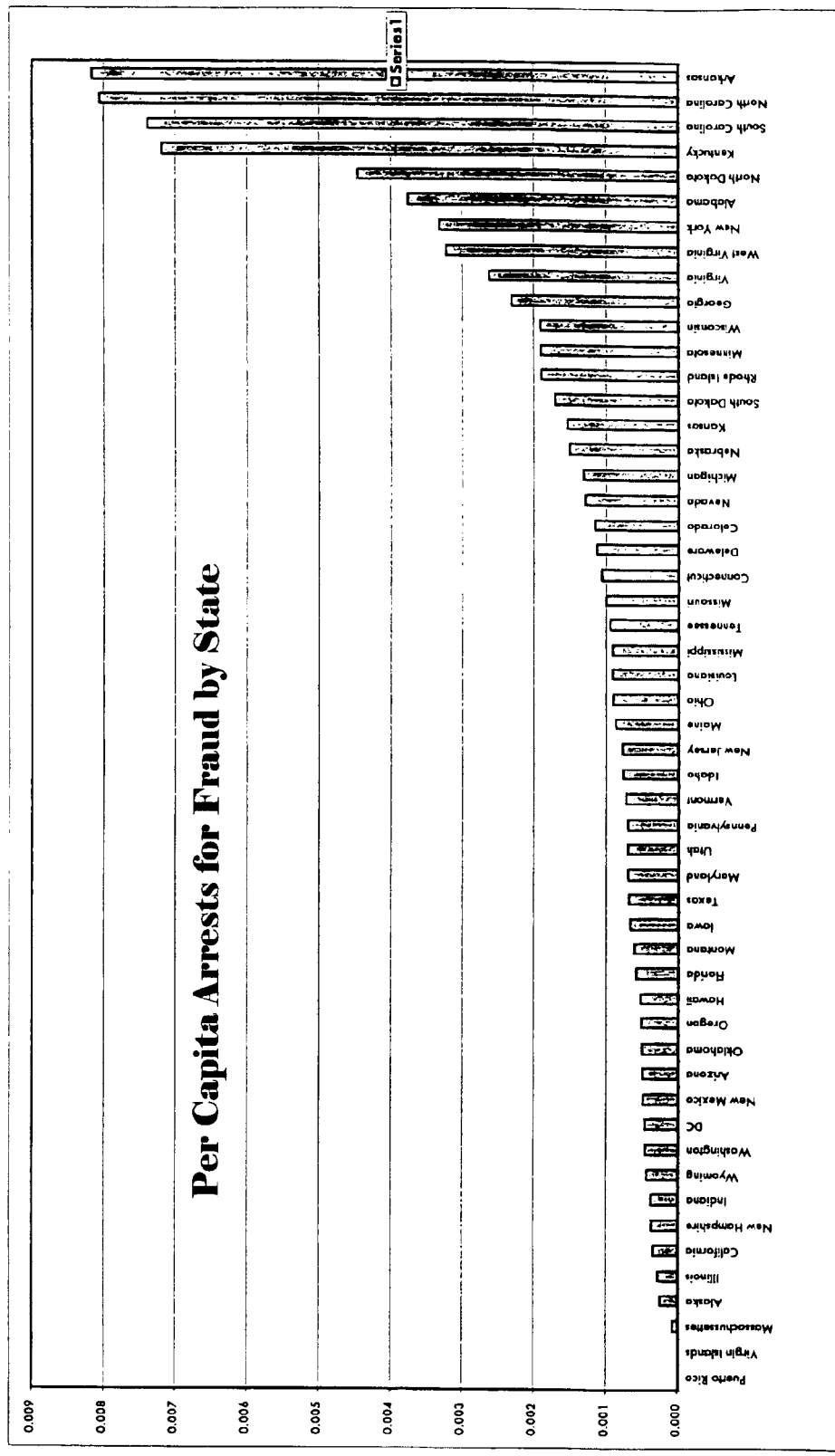
FIG. 3 is a bar graph of fraud arrests per capita ranked by state.

Applicant plotted the number of fraud arrests per capita by state as illustrated in FIG. 3. And once the states were ranked according to fraud per capita, the curve illustrated in FIG. 4 demonstrates an eight fold variation in per capita fraud rates. Accordingly, applicant found a large concentration of fraud arrests in very few states and very little change throughout the rest of the population.

Figure 4:
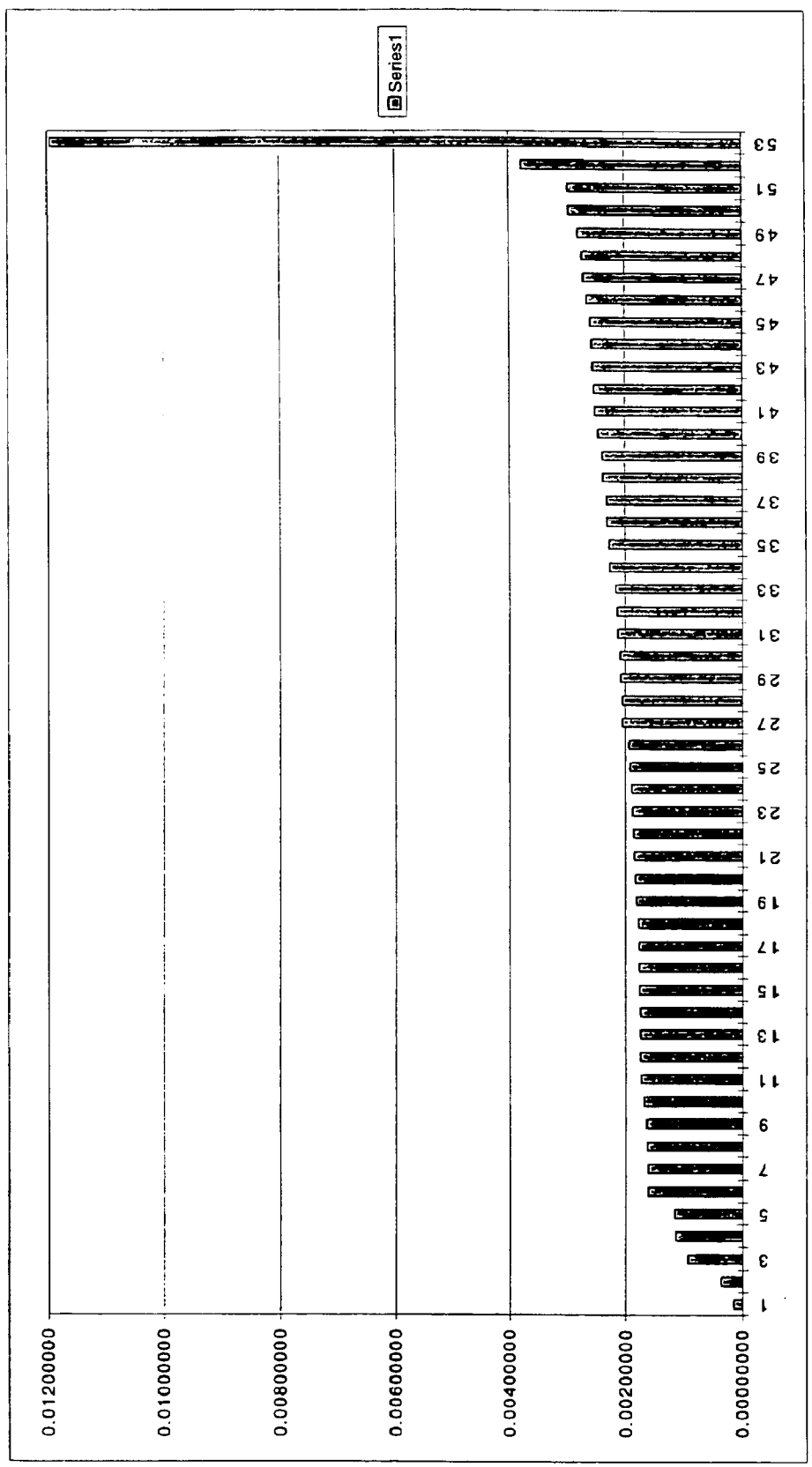
FIG. 4 is a line graph of fraud arrests per capita ranked by state.

To ensure that the phenomenon depicted in FIGS. 3 and 4 was not an artifact of the data, applicant then studied the census data, looking at 30 to 40 different factors such as number of children per family, education, income, address, zip code, account numbers, religious participation, etc., to determine which factors influenced the incidence of fraud arrests. However, the greater the number of factors analyzed, the greater the "noise" or false positives discovered because of the innocent changes associated with such data. Nevertheless, this exercise essentially identified the location of the fraud victims on the basis of these factors. States having high incidences of fraud had a positive relationship to Christian church membership, low education and low income. Such individuals may be the most susceptible to fraudulent transactions since they may be more likely to trust the perpetrator.

In any event, analyzing 30 to 40 factors proved to create too much noise in the system and skewed the data. Based on applicant's years of experience of being involved in fraud cases, he has observed that perpetrators lie, but lie very little. Perpetrators desire to tell as much truth as they possibly can to establish their credibility. Credibility is crucial to their success. Today, a substantial amount of fraud takes place in banks. To verify identities, banks go to large data managers such as Equifax, Trans Union, Experian, etc. Thus, the perpetrator must successfully weave his way through such systems. He can only do so by manipulating his identity. The perpetrator prefers to reuse the transposed numbers and letters of an altered identity in a way that they appear innocent and can be explained away (e.g., typographical errors). In order for the criminal to defeat the systems in place at the credit reporting agencies and other record providers, the criminal need only make a subtle change in identity. Each single identity has tens of thousands of variations that do not require a significant name change. Criminals are expert in digital systems (most fraud is perpetrated by organized criminal elements), and can easily defeat all of the screening systems of the prior art. Applicant targeted this specific behavior as a means for identifying suspicious conduct that is likely to lead to a fraud loss if unchecked.

In order to solve the problem of excess noise and false positives, applicant employed an iterative searching process to determine which changes are innocent and which ones are fraudulent. A database representing about 56 million records of checking account openings in roughly the same period (1993) as the fraud data was supplied by a subsidiary of Deluxe Corporation. Because the geographic market penetration of the Deluxe data did not perfectly match the actual census data, the fraud model was normalized using standard techniques to account for the difference. A name matching fuzzy logic software package was acquired from Search Software American (Name 3). This name matching software allows for the fuzzy association of both alpha and numeric information with a wide range of nearly infinitely tunable association algorithms tied to the various identity data in the system. The data was first grouped into sets of matching or related identities.

Figure 5:
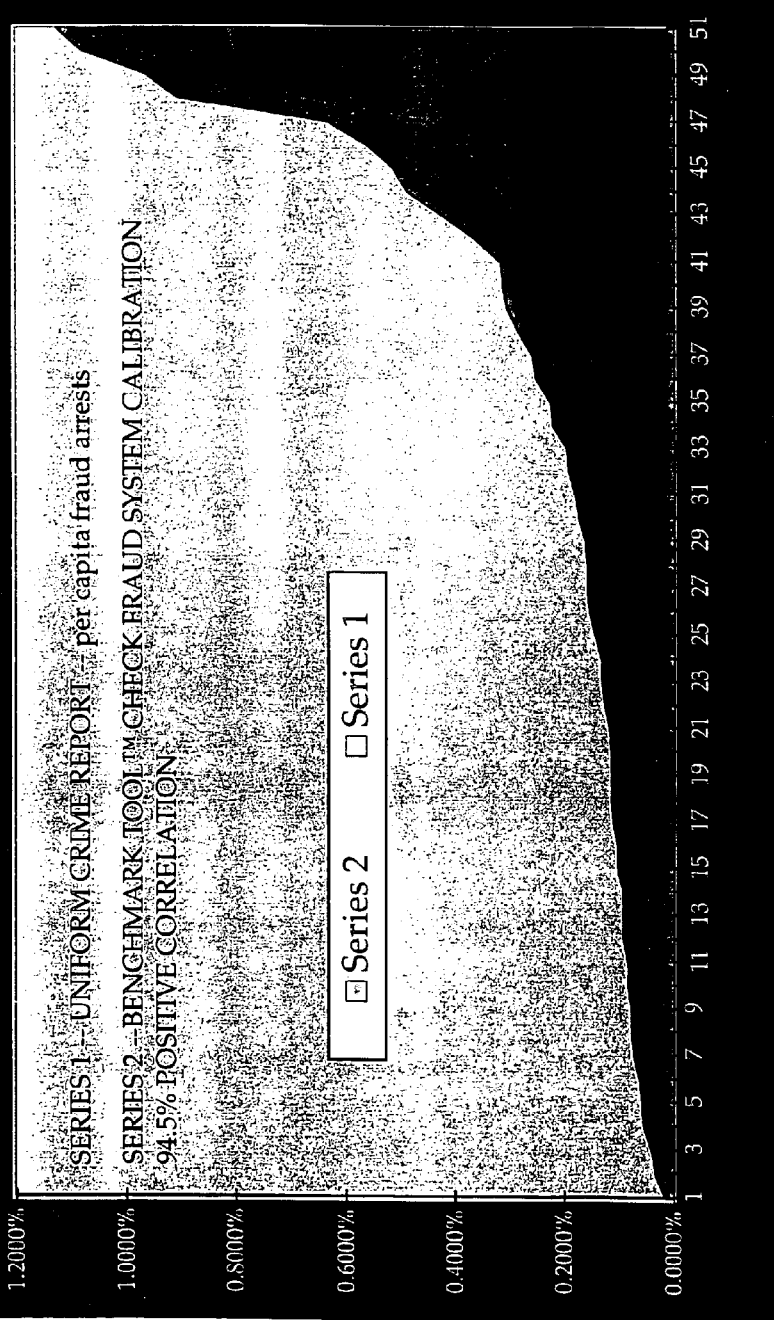
FIG. 5 is a line graph of fraud arrests per capita ranked by state.

It was applicant's hypothesis that a curve of changes in the identity data (controlled for geographic location) would substantially match the curve of per capita fraud ranked by geographic location. Beginning with the default settings supplied by the search software, a curve of per capita associations (i.e., groupings of similar identities that represent the same digital identity) was generated and compared to the curve from the standardized (normalized) fraud model curve of FIG. 4 to determine the correlation between changes in the identity information in the grouping from the 56 million records and the incidence of fraud per capita. Accordingly, applicant made changes in the association algorithms until an optimal match was obtained between the frequency curve generated from the Deluxe data, and the standard fraud curve of FIG. 4. As illustrated in FIG. 5, this optimal level was achieved at approximately a 94.5% positive correlation between the two curves. The changes in the algorithms were iterative, usually relating to only one piece of identity data (e.g., address, zip code, and driver's license number). From this iterative process, applicant realized that the analysis of only names and Social Security numbers would result in the optimal match. Consequently, the scoring tables stated above represent the final iteration of the search algorithms and the optimization process used herein. The data in the final iteration was also analyzed for geographic location (i.e., location of the bank supplying the data) to ensure that the variable on the X axis used to overlay the two curves in FIG. 5 was the same. Because the Deluxe data used in obtaining the 94.5% correlation did not contain data relating to per capita fraud arrests, the two curves in FIG. 5 were not controlled for the variable on the Y axis (i.e., percent of per capita arrests). Nevertheless, applicant postulated that the precise algorithm optimally tied to identity manipulations, which results in a curve most closely matching the curve of FIG. 4 would positively correlate to per capita fraud arrests.

The above scoring charts and system resulted from that precise algorithm. To test applicant's results of a 94.5% correlation between the two curves, applicant compared the records of 188,602 individuals identified by applicant as having manipulated their identities in opening checking accounts with ChexSystems' comprehensive Reported Names Database and obtained 188,415 record matches. In addition, applicant obtained the identities used by known perpetrators of bank fraud from a bank customer. From this list, 21 identity records that matched the timeframe of applicant's test data were blindly distributed within the 56 million records used for system development. Applicant's random chances of identifying the test records were 21:56,000,000. Nevertheless, applicant successfully identified all 21 known perpetrators and identified no false positives. Applicant has further tested the system with successful results.

After a user's alphanumeric data is scored by search engine 62, the system of the present invention continues the inventive enrollment process. If the score is within the acceptable limits of confidence and the submitted identity data are not suspicious, then the record is transmitted via output file 64 and affirmative step 66 to approved file 70. The suspicious sets of identity data determined by the above process are output via output file 64 and transferred to derogatory file 72 in step 68. File 72 comprises alphanumeric subfile 74 and biometric subfile 76, and will typically contain approximately 10 million such sets of suspicious records and approximately 32 million identity records. Based on applicant's empirical data, these sets of identities have been intentionally manipulated by individuals for the purpose of deception. A copy of files 72, 74 and 76 are transmitted to database 60 as a folder to maintain the comprehensiveness of database 60 and to ensure the most accurate scoring when a user enrolls. The non-suspicious sets of identities remain in database 60 and are copies of each other and innocent by nature.

The alphanumeric component of enrollment system 50 is illustrated by the following examples:
Enrolling for the first time is:
Abe Lincoln 123-45-6789.
Search 62 of database 60 identifies the following existing records:
  Abraham Lincoln 123-45-6789, Score 99
  Abraham Lincoln 123-45-6789, Score 98
  H. Abe Lincoln 123-45-6789, Score 96.
Abe's alphanumeric identity data is within acceptable limits and his data is transmitted to approved file 70 via output step 64.
Enrolling for the first time is:
William Clinton 987-65-4321.
Search 62 of database 60 identifies the following existing records:
  William J. Clinton 987-65-4321 score 100
  Bill Clinton 987-65-4321 score 100
  Clint Williams 897-65-4321 score 93
  William Clintock 987-65-4322 score 89.
William Clinton's alphanumeric data reveal suspicious records according to applicant's scoring system. William Clinton is not approved and his record is transmitted to derogatory file 72 with a copy in a derogatory file folder in database 60. Thus, if William Clinton attempts to enroll again, the derogatory data located in database 60 will be triggered, and enrollment is denied.

The enrollment process continues with obtaining one or more biometric exemplars from the user using biometric input device 48. The system of the present invention can utilize any commercially available biometric, including face printing, voice printing, finger printing, retinal printing, iris printing and DNA mapping. Numerous biometric devices are known in the art, such as those available from Mytec Technologies of Toronto, Canada; Intelitrak Technologies of Austin, Tex., and National Registry, Inc. of Tampa, Fla. Additional information regarding biometrics can be found at the International Biometric Industry Association's website at www.ibia.org.

Most users will opt for the use of voice printing biometrics because no additional computer equipment is necessary if the user's computer includes a microphone, as is the case with most computers. Alternatively, a signal can be sent from system 50 to the user's computer to put the user's modem on hold, to permit the user to employ a telephone handset to deliver a voice sample in the enrollment and verification processes.

The biometric exemplar, in digital form as known in the art, is captured and transmitted via a communication network, preferably the internet, to the Central Biometrics Authority (CBA) 78, a system available from the International Biometrics Group (IBG), or other like system, to ensure that the particular biometric employed by a user meets the appropriate standard of sensitivity set for the type of device used and the type of transaction.

CBA 78 has the ability to process the information from all commercially available biometric technologies and devices in a manner that captures the setting of the devices and the degree of certainty that the device is capturing the biometric. This includes such things as the number of attempts to certify the biometric, whether the certification is contemporaneous or stored, etc. This information is then integrated to match the desired or required certainty level for the party requesting verification. For instance, an online stock brokerage may desire a very high level of certainty for a $100,000 stock trade, but an online bookstore might only require a 51% certainty level for a $10 sale.

Once the CBA 78 approves the submitted biometric, the biometric extract 80 is transmitted to and stored in biometric suspense buffer 82. If the CBA 78 rejects the biometric exemplar from device 48 in step 84, a signal is sent to the user from CBA 78 to resubmit another biometric exemplar. This process can repeat itself an unlimited number of times, although generally after a user's biometric is rejected three times, CBA 78 will send the user a message informing her/him to employ a different device 48.

Each biometric input device 48 is preferably linked to the alphanumeric input device 46 such that the biometric exemplar is identified as that of the user by name, address, Social Security number, password, etc. Thus, each biometric record in suspense buffer 86 has some alphanumeric data identifier in order for it to be matched with the user's alphanumeric identity record which was processed as explained above and either approved or rejected in steps 66 and 68, respectively.

After the biometric record is stored in buffer 86, buffer 86 then queries approved file 70 and derogatory file 72 for matching alphanumeric identity information. If a match is found in file 70, the approved alphanumeric identity record and the approved biometric record are coupled in storage device 88 and transmitted to identity escrow server or database 90 ("Virtual Safety Deposit Box"). Accordingly, each enrolled user's approved alphanumeric and biometric records are stored in identity escrow database 90 ready for use in the verification process. Each user's records can be further coupled to ancillary database 92, which may contain any other personal information such as financial and medical records. Conversely, if a match is found in file 72, the user's biometric is coupled with the user's alphanumeric data from derogatory subfile 74 and transmitted and stored in biometric subfile 76.

D. Verification System.

Figure 6:
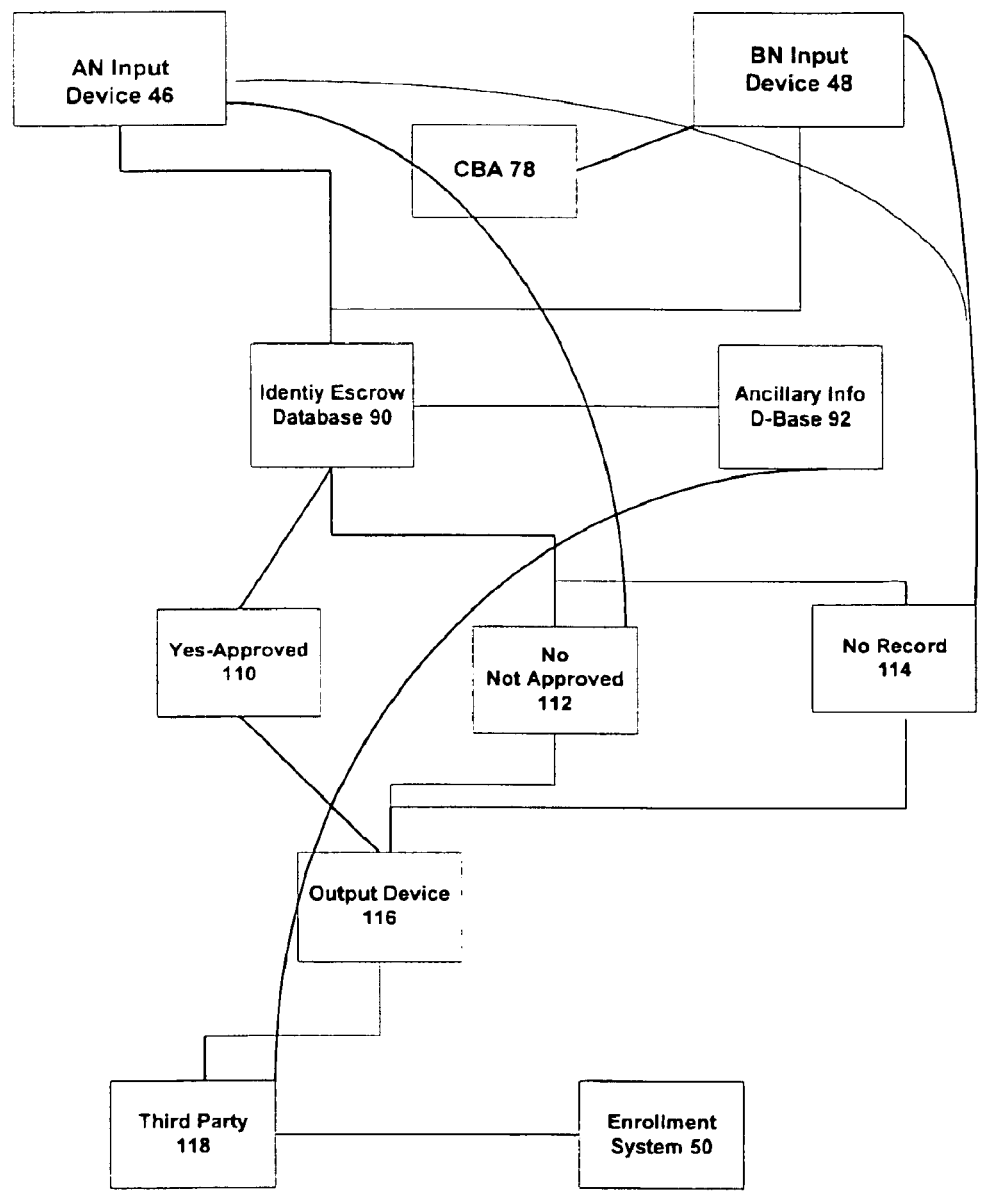
FIG. 6 is a block diagram view of an embodiment of the verification system of the present invention.
Figure 14:
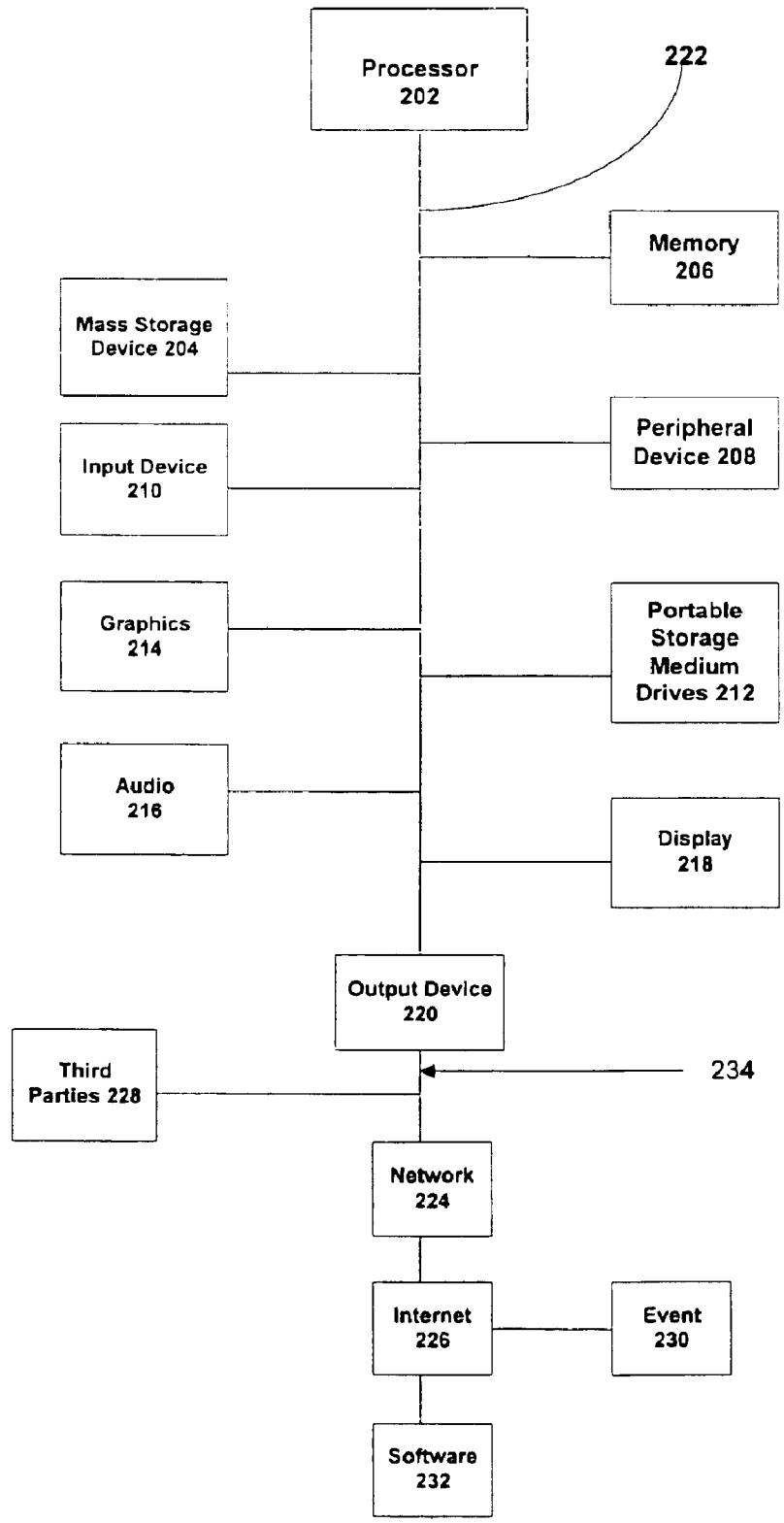
FIG. 14 is a block diagram view of the warranty system of the present invention.

Referring to FIG. 6, verification system 100 comprises input devices 46 and 48, searchable identity escrow server or database 90 and output device 116. Input devices 46 and 48, detailed above, are connected to identity escrow database 90 through the internet, by telephone, or by any other signal transmission means known in the art. Database 90 serves as the central verification clearinghouse for the approval or disapproval of a request for identity verification. Database 90 can take any form as known in the art and will typically reside on a mainframe computer. Database 90 may be connected to ancillary information databases 92. The system of the present invention further comprises means for linking escrow database 90 to third party providers 92 of information specific to individual customers to be stored in connection with the approved identity data signal and biometric data signal. Such third party providers can include any database or set of information such as, for examples, banks, hospitals, doctors, lawyers, and financial services entities. Output device 116 is any known device capable of sending electronic messages to third party 118, such as a modem or other internet connection means.

2. System Operation.

A standard personal computer capable of internet access or a standard telephone or other known telecommunication device are compatible with the system of the present invention. Computer system 10, for example, can be employed. Computer system 10 further comprises biometric input device 48, which is a combination of hardware and software and enables the user to provide the biometric exemplar for enrollment into the system, but also the biometric samples for each use of verification system 100. Biometric input device 48 is selected from a wide variety of available technology, including fingerprint recordation devices, voice print recorders, retinal image recorders, hand geometry recorders, and the like. Device 48 can be combined with a camera so that a photograph or digital image becomes a part of the biometric data record. The biometric data record is preferably encrypted to enhance security. Depending upon their construction and sensitivity, devices 48 vary in ability to resist fraud. Consequently, e-retailers may dictate more stringent device parameters for high-valve, high-security transactions (e.g., stock trades), or less stringent parameters for low-value, low-security transaction (e.g., sale of $20.00 item). Because almost all biometric devices 48 have different sensitivities and error rates they thus have different software attendant thereto. As explained above, the system of the present invention communicates with the CBA 78 during enrollment and verification (as part of a predetermined third set of criteria) to ensure accuracy of the biometric sample.

To enroll in system 50, users provide alphanumeric identity data via the internet, by telephone, by mail, etc. System 50 (as well as system 100) assigns and encrypts this data, prepares forms for mailing and signature and communicates with third party networks. As described above in connection with enrollment system 50, such identity data is searched against existing data in database 60 and scored to determine the existence of suspicious identity records. All suspicious records are copied to derogatory file 72, and the users providing such information are declined from enrollment system 50 or are requested to provide additional information. Notice to such users is by e-mail or other known means. Consequently, enrollment includes a confirmation step, to a high degree of certainty, that the particular individual is who he/she says he/she is.

Enrollment further comprises acquiring from the user data representing one or more of the individual's biometric characteristics. After successful processing by CBA 78, such data is stored in biometric suspense buffer 86. Multiple biometric data samples are preferred so as to account for variations among the samples and to increase the reliability of authentication. As detailed above, in order for the system to be ready to verify a user's identity, the biometric data record is then stored in database 90 in association with the user's approved alphanumeric identity record of file 70.

Preferably, but not required, system 50 assigns each user an anonymous or shared personal identification number or name ("PIN"). This PIN is coupled to the user's alphanumeric and biometric records and is shared with many other users. The PIN may be coupled to such records by the party seeking verification, i.e., the merchant, financial institution or government. The purpose of using a shared PIN is that it speeds the verification process. For example, system 50 has assigned (or the user has chosen) "Sammy Sosa" as the user's PIN. If there are 9,999 other users utilizing "Sammy Sosa" as their PIN, system 100 only has to search 10,000 files during verification. The PIN may be in alphanumeric or digital voice form. Although the system of the present invention will function using an individualized, non-shared PIN, there are disadvantages besides slowing verification system 100 with which to contend. For example, the user may be in a location where her/his PIN can be seen overheard by third parties. Conversely, with a shared PIN, there is no need to keep it confidential.

Users can be individuals or business entities and, thus, enrollment can take many forms. For example, authorization can be restricted to one or more individuals within a particular organization.

During verification, verification system 100 receives encrypted alphanumeric and/or biometric identity data via devices 46 and/or 48. Such identity data can be transmitted to system 100 from virtually anywhere using known computer and telecommunications technology. Applications include e-commerce transactions where a website requests verification of the identity of one of its users prior to completing a transaction; home security systems, military security systems and countless other applications. Such third parties and e-commerce providers are preferably registered with system 100. Upon transmission, these data are decrypted by database 90 using a channel supporting secure socket layer (SSL) or some other security protocol. Database 90 then determines whether it has enrolled the claimed identity of the user seeking authentication. CBA 78 and database 90 preferably filter out unacceptable messages. Such messages can include those claiming an identity that does not agree with any records available in database 90, such as messages containing PINs or identity data of persons not enrolled in system 100, or messages from websites not registered with system 100.

In configurations using PINs, preferably shared PINs, database 90 preferably determines whether the transmitted PIN matches any of the PINs in database 90. Within the identities stored under the shared PIN, each biometric technology has varying capabilities of performing limited 1 to N searches.

The identity escrow server/database 90 compares the alphanumeric and biometric data (or the biometric data alone) of each transmitted message with the records stored in the database 90. Recall that the biometric transmission is first processed by CBA 78, although this step is not essential to successful operation. To verify the individual's claimed identity, database 90 typically compares the transmitted biometric data to the records of the enrolled individual.

A user's live data may fail to match exactly the user's biometric records. This occurs because acquisition of biometric data is subject to variations, both in the enrollment mode and in verification mode. Accordingly, CBA 78 and database 90 preferably employ comparison algorithms that do not require exact matches between the live data and records, but provide a high level of accuracy. The comparison algorithms generally are implemented to determine the statistical closeness of the live data to the records. In that implementation, database 90 produces an affirmative response in the event of a sufficient match, i.e., if the closeness determination yields a result that falls into a selected range of confidence determined to be acceptable. In contrast, database 90 produces a negative response if the result falls into a selected range of confidence determined to be unacceptable. Database 90 preferably also supports an indeterminate response (e.g., try again/provide more data) if the above ranges are not complementary and the result falls between such ranges. The indeterminate response can also result for other reasons, including that database 90 is down, busy or otherwise. The ranges of sensitivity used in the comparison algorithms may vary among biometric characteristics. For example, a range having high sensitivity may be selected for highly secure transactions and vice versa. In any case, optimum sensitivity selections are generally made to strike a balance between false positives and false negatives.

Following each verification, database 90 produces a response in steps 110, 112 and 114. Database 90 transmits the response to output device 116, the response being that the user's identity is or is not verified from processing steps 110 and 112, or that system 100 contains no data for such user from processing step 114. Output device 116, and system 100 for that matter, only transmits to third party 118 whether or not the user is verified or that no records exist. No identity data of any kind is ever transmitted to third party 118. Thus, verification system 100 is highly secure against hackers.

If output device 116 transmits a "No" message resulting from step 112, third party 118 and system 100 may employ a predetermined set of criteria to request the user to re-attempt verification. The number of re-attempts allowed may depend on the level of security for the particular transaction.

If, in step 114, no record is found in database 90, this message is transmitted by output device 116 to third party 118. Third party 118 may then electronically or telephonically direct the attempted user to enrollment system 50 through a different website or server, or enrollment system 50 may be integrated with third party 118's system so as to seamlessly enroll the user into system 50. Alternatively, third party 118 may provide the attempted user with a website address or link, telephone number or mailing address for direct contact with system 50.

Plural verification systems 100 and enrollment systems 50 can be employed such that verification can be specific for a particular third party 118. For example, a bank may operate a captive database 90 only for its customers who have registered with system 50 when opening their respective bank accounts. Conversely, in an open structure, database 90 can process verification requests from any source.

The identity verification system of the present invention can be employed for any type of transaction or event where verification of the user is necessary or helpful to prevent identity fraud. Such transactions may include any e-commerce transaction such as the purchase of goods using a credit card where, as part of the computerized credit card authorization process, the user is queried as to whether he/she has previously enrolled in system 50 and, if so, is asked to supply the necessary biometric to be processed through verification system 100. Once system 100 responds with a "Yes" to the credit card vendor, the vendor can authorize the charge and the retailer may complete the transaction, the vendor having received verification with a high level of confidence that the user of the credit card is the actual owner of the card.

The present invention further relates to a system a method for providing users of systems 50 and 100 with a warranty against the theft of their identity data. Warranty system 200 is linked to systems 50 and 100 by hyperlink or other telecommunication means. System 200 is similar to system 10 and comprises like components: Processor 202, mass storage device 204, memory 206, peripheral device 208, input 210, portable storage medium drives 212, graphics subsystem 214, audio subsystems 216, display 218, output device 220 connected by bus 222. System 200 may be further connected to a network 224, such as the internet 226 and third parties 228. As with system 10, events 230 trigger software 232 to activate and run system 200. Upon the request of a customer using systems 50 and 100, warranty coverage can be purchased. Such coverage protects the customer from the theft or misuse of his/her identity data used in systems 50 and 100.

3. User Interface.

As illustrated in FIG. 7, the user views the welcome screen on display 26 in an internet application of the present invention. Using device 48, the user inputs the requested alphanumeric information and submits a biometric exemplar. The user then clicks "submit" to continue. The screen shown in FIG. 8 is then displayed and, if the user has been approved, he/she is queried for the warranty coverage. If the user clicks "yes," he/she is taken to the next screen (FIG. 9). The user then clicks on "continue" to activate system 200 whereupon additional screens are engaged to enroll and use system 200.

FIGS. 10–13 are additional screen displays of the verification system of the present invention.

While the present invention has been described in connection with the preferred embodiments, it will be understood that modifications thereof within the above principles will be evident to those skilled in the art and, thus, the invention is not limited to the preferred embodiments but is intended to encompass such modifications and all equivalents thereto.

What is claimed is:

1. A system for the identification and verification of a user, comprising:
   (a) an enrollment system for ensuring the user represents a person authorized to enroll in the system comprising:
   (i) at least one alphanumeric input device;
   (ii) at least one biometric input device;
   (iii) at least one header file database having a plurality of identities;
   (iv) at least one search engine, said search engine in communication with said header file database such that said search engine receives an alphanumeric data signal associated with identity data input into said alphanumeric input device by the user, and then searches said database for identities that match the alphanumeric data according to a predetermined first set of criteria;
   (v) a processor to generate a score for each identity found by said search engine to match the identity data according to a predetermined second set of criteria based on objective data, said processor capable of determining that said user's identity data is not suspicious based on said score prior to authorizing enrollment;
- (vi) an identity escrow database which is in communication with said processor and receives from said processor an approved identity data signal based on the user's identity data, said escrow database additionally in communication with said biometric input device capable of receiving at least one enrollment biometric data signal input by the user to said biometric input device only after the processor has determined that said user's identity data is not suspicious, said escrow database further comprising means for coupling the approved identity data signal and the received enrollment biometric data signal to create at least one subfile within the escrow database for each user comprising the approved identity data signal and the received enrollment biometric data signal; and
- (b) a verification system for verifying the identity of said user after the processor has determined that said user's identity data is not suspicious and the user has enrolled in the enrollment system comprising:
  - (i) means for processing a live biometric data signal input by the user to the biometric input device to match the user's received enrollment biometric data in said escrow database according to a predetermined third set of criteria; and
  - (ii) an output device for transmitting to a third party whether a match was located within said escrow database for said user.

2. The system of claim 1 wherein said header file database contains bank account opening data.

3. The system of claim 1 wherein the predetermined second set of criteria is mathematically correlated to the per capita rate of fraud arrests in the United States.

4. The system of claim 1 further comprising means for interfacing with the internet so the user and third parties can conduct e-commerce transactions using the system.

5. The system of claim 1 further comprising means for ensuring that the at least one received enrollment biometric data signal and the live biometric data signal meet the appropriate standard of sensitivity for the live biometric input device employed by the user.

6. The system of claim 5 wherein said ensuring means comprise communication with a Central Biometric Authority database.

7. The system of claim 1 further comprising means for providing the user with a warranty against identity theft.

8. A system for creating an identity escrow subfile for a user, comprising:
- (a) at least one alphanumeric input device;
- (b) at least one biometric input device;
- (c) at least one header file database having a plurality of identities;
- (d) at least one search engine, said engine in communication with said header file database such that said engine receives an alphanumeric data signal associated with identity data input into said alphanumeric input device by the user, and then searches said database for identities that match the alphanumeric data according to a predetermined first set of criteria;
- (e) a processor to generate a score for each identity found by said search engine to match the identity data according to a predetermined second set of criteria based on objective data, said processor capable of determining that said user's identity data is not suspicious based on said score prior to creating the identity escrow file; and
- (f) an identity escrow database which is in communication with said processor and receives from said processor an approved identity data signal based on the user's identity data, said escrow database additionally in communication which said biometric input device capable of receiving at least one enrollment biometric data signal input by the user to said biometric input device only after the processor has determined that said user's identity data is not suspicious, said escrow database further comprising means for coupling the approved identity data signal and the received enrollment biometric data signal to create at least one subfile within the escrow database for each user comprising the approved identity data signal and the received enrollment biometric data signal.

9. The system of claim 8 further comprising storage means for the user to store other electronic data in said escrow database coupled to said approved identity data signal and the received enrollment biometric data signal.

10. The system of claim 8 further comprising means for accessing said subfile within the escrow database.

11. The system of claim 9 further comprising means for linking said escrow database to third party providers of information specific to said user to be stored in connection with the approved identity data signal and the received enrollment biometric data signal.

12. The system of claim 10 wherein said third party providers are selected from the group consisting of banks, hospitals, doctors, lawyers, and financial services entities.

13. A method for identifying and verifying a user, comprising:
- (a) Obtaining alphanumeric identity data from the user;
- (b) Searching the alphanumeric identity data against data in a header file database for matching data according to a predetermined first set of criteria;
- (c) scoring said matching data according to a predetermined second set of criteria based on objective data to determine if the alphanumeric identity data is not suspicious;
- (d) only after the alphanumeric identity data is determined to be not suspicious, creating an approved identity data signal and receiving an enrollment biometric exemplar from the user;
- (e) Coupling the approved identity data signal to the received enrollment biometric exemplar to form a subfile within an escrow database;
- (f) Processing a live biometric exemplar to match the user's received enrollment biometric exemplar in the escrow database and coupled to said approved identity data signal; and
- (g) Outputting an approved signal to a third party upon the match of the received enrollment biometric exemplar and the live biometric exemplars.

14. A system for the identification and verification of an identity of a user, comprising:
- (a) an enrollment system for ensuring the user represents a person authorized to enroll in the system comprising:
  - (i) at least one alphanumeric input device;
  - (ii) at least one biometric input device;
  - (iii) at least one header file database having a plurality of identities;
  - (iv) at least one search engine, said search engine in communication with said header file database such that said search engine receives an alphanumeric data signal associated with identity data input into said alphanumeric input device by the user, and then searches said database for identities that match the alphanumeric data according to a predetermined first set of criteria;

(v) a processor to generate a score for each identity found by said search engine to match the identity data according to a predetermined second set of criteria based on objective data, said processor capable of determining that said user's identity data is not suspicious based on said score prior to authorizing enrollment;

(vi) an identity escrow database which is in communication with said processor and receives from said processor an approved identity data signal based on the user's identity data, said escrow database additionally in communication with said biometric input device capable of receiving at least one enrollment biometric data signal input by the user to said biometric input device only after the processor has determined that said user's identity data is not suspicious, said escrow database further comprising means for coupling the approved identity data signal and the received enrollment biometric data signal to create at least one subfile within the escrow database for each user comprising the approved identity data signal and the received enrollment biometric data signal;

(b) a verification system for verifying the identity of said user after the processor has determined that said user's identity data is not suspicious and the user has enrolled in the enrollment system comprising:

(i) means for processing a live biometric data signal input by the user to the biometric input device to match the user's received enrollment biometric data in said escrow database according to a predetermined third set of criteria; and (ii) an output device for transmitting to a third party whether a match was located within said escrow database for said user; and (c) means for activating the escrow database other than the live biometric data signal to send a signal to the output device and then to the third party.

15. The system of claim 14 wherein the means for activating the escrow database is a personal identifier (PIN).

16. The system of claim 15 wherein the PIN is a shared PIN.

17. The system of claim 15 further comprising means for adjusting the criteria of sensitivity necessary for the live biometric data signal to activate the escrow database to send an approved signal to the output device for different e-commerce transactions.

18. The system of claim 15 further comprising means for obtaining warranty insurance coverage against identity theft.

19. The system of claim 18 wherein said warranty means is a warranty computer linked to the system via the internet.

20. The system of claim 15 further comprising a plurality of enrollment and verification systems running in parallel.

* * * * *